A. W. FINLAYSON.
RADIATOR.
APPLICATION FILED SEPT. 28, 1917.
1,286,978.
Patented Dec. 10, 1918.
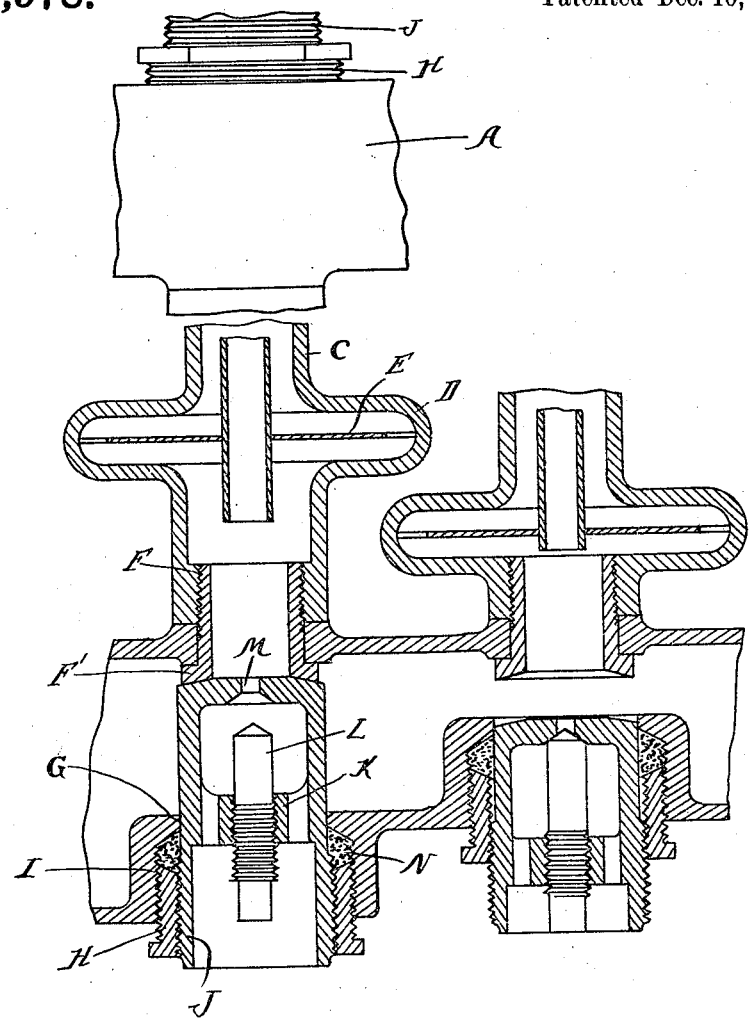
Inventor
Alexander W. Finlayson
By Whittemore Hulbert & Whittemore
Attorneys

UNITED STATES PATENT OFFICE.

ALEXANDER W. FINLAYSON, OF DETROIT, MICHIGAN.

RADIATOR.

1,286,978. Specification of Letters Patent. Patented Dec. 10, 1918.

Application filed September 28, 1917. Serial No. 193,635.

*To all whom it may concern:*

Be it known that I, ALEXANDER W. FINLAYSON, a citizen of the United States of America, residing at Detroit, in the county of Wayne and State of Michigan, have invented certain new and useful Improvements in Radiators, of which the following is a specification, reference being had therein to the accompanying drawings.

The invention relates to radiators of the type in which the radiating surface is formed by a series of tubes connected at their opposite ends to headers. It is the object of the present invention to provide means for individually cutting out the radiating tubes, so that in case of leakage in any one of the tubes it can be disconnected from the headers to render the radiator still operative.

In the drawings:

The figure is a sectional elevation of a portion of a radiator embodying my invention.

A and B are the top and bottom headers of a radiator, and C are the radiating tubes extending therebetween. These tubes are preferably formed with a series of lateral extensions D, within which are arranged baffles E which deflect the water passing through the tubes and cause it to pass in contact with the entire radiating surface. The tubes C are connected to the headers A and B, preferably by threaded flanged nipples F, and these are inserted through alined apertures G in the outer wall of the header. Thus in assembling, the tubes C may be readily attached to the headers or may be removed when required, for replacement or repair.

It sometimes happens that a radiator is injured when in service so as to produce a leak in one or more of the tubes, which is sufficient to drain the radiator and render it inoperative. It is often inconvenient to stop for repairs, and I have devised a construction in which such an injured tube can be quickly cut out of service without the necessity of detachment from the headers. As shown, H are threaded bushings engaging correspondingly threaded recesses I in the outer wall of the header in alinement with the nipples F, and J are hollow members having a threaded engagement with said bushings and adapted to be adjusted with their inner ends in contact with the flanges F' of the nipples F. When so adjusted, communication between the hollow interior of the header and the connected tube C is cut off, but by adjusting the member J outward it may be withdrawn from the flange F' so as to open communication between the tube and the header. The members have preferably arranged therein centrally threaded bearings K in which are arranged plug valves L for coöperating with vent ports M in the member J. This permits of withdrawing the valves L to open said ports M, thereby draining off any water which may be in the tube C.

In use, when the headers are assembled the members J are normally adjusted so as to leave unrestricted communication between each of the tubes and the headers. Circulation therefore takes place, either by thermosiphon or by pump-feed, and as long as the radiator is in condition no further adjustment is required. If, however, any one of the tubes is injured or should spring a leak through any cause the members J at opposite ends thereof are first adjusted by turning in their threaded bushings until they close the opening into the nipples F and cut off communication between the tube and header. If the radiator is in operation during extremely cold weather and one or more of the tubes should thus be cut out, there would be danger of the water in the tubes freezing. This is prevented by opening the plug-valves L, which permit the draining out of the water without in any way disturbing the valves which shut off communication with the headers. Leakage between the members J and the threaded bearings in which they are adjusted is prevented by placing packing N in the recess I, which is compressed by the threaded bushing H.

What I claim as my invention is:

1. In a radiator, the combination with a radiating tube and a header to which it is connected, of a nipple for connecting said header to said tube insertible through an alined aperture in the outer wall in said header, a hollow member threaded to engage the correspondingly threaded bearing in said outer wall and adjustable to seat upon said nipple and to thereby cut off communication between said tube and header, said member having a port opening to its interior and adapted to communicate with the nipple when the member is seated thereupon to vent the liquid in the tube, and a valve within said hollow member controlling the vent port.

2. In a radiator, the combination with a radiator tube and a header with which said tube is connected, of a flanged nipple for connecting said header to said tube insertible through an alined aperture in the outer wall of the header, a hollow valve member having a threaded engagement with a bearing in said alined aperture and adjustable into contact with said nipple to cut off communication between said header and tube, and a plug-valve having a threaded bearing within said hollow member coöperating with a port in said hollow member to form a drainage passage for the liquid in said tube.

3. In a radiator, the combination with a radiating tube and a header to which the same is connected, of a nipple for connecting said header to said tube insertible through an alined aperture in the outer wall of said header, a hollow member adjustable to seat upon said nipple and thereby cut off communication between said tube and header, said member having a port opening to its interior and adapted to communicate with the nipple when the member is seated thereupon to vent the liquid in the tube, and a valve within said hollow member controlling said vent port.

4. In a radiator, the combination with a radiator tube and a header with which said tube is connected, of a flanged nipple for connecting said header to said tube insertible through an alined aperture in the outer wall of the header, a hollow valve member forming a closure for said alined aperture and adjustable to a seat upon said nipple to cut off communication between the header and tube, and a valve interiorly carried by said hollow member and coöperating with a port therein to form a drainage passage for the liquid in said tube.

5. In a radiator, the combination with a header and a radiator tube connected therewith, of a hollow member adjustable in the outer wall of the header in alinement with the connection between said header and tube, a seat against which said hollow member may be adjusted for cutting off connection between the header and tube, and a valve mounted within said hollow member and adjustable relative thereto to coöperate with a port in said member forming a drainage passage for the liquid in said tube.

In testimony whereof I affix my signature.

ALEXANDER W. FINLAYSON.

Copies of this patent may be obtained for five cents each, by addressing the "Commissioner of Patents, Washington, D. C."